United States Patent [19]

Morin et al.

[11] Patent Number: 5,684,500

[45] Date of Patent: Nov. 4, 1997

[54] MULTIPLEXED CONTROL ACTIVE MATRIX DISPLAY SCREEN

[75] Inventors: François Morin; Christophe Deffontaines, both of Paris; Louis Delgrange, Port Marly, all of France

[73] Assignees: France Telecom; Societe Sagem, both of Paris, France

[21] Appl. No.: 473,227

[22] Filed: Jun. 7, 1995

[30] Foreign Application Priority Data

Jun. 17, 1994 [FR] France ............... 94 07449

[51] Int. Cl.⁶ ............... G09G 3/36; G02F 1/1343
[52] U.S. Cl. ............... 345/92; 359/59
[58] Field of Search ............... 345/92, 90, 103; 359/59, 54, 62, 87, 88; G09G 3/36

[56] References Cited

U.S. PATENT DOCUMENTS

| | | | |
|---|---|---|---|
| 5,296,870 | 3/1994 | Nicholas | 345/89 |
| 5,299,041 | 3/1994 | Morin et al. | 359/59 |
| 5,432,625 | 7/1995 | Morin et al. | 359/59 |
| 5,517,342 | 5/1996 | Kim et al. | 359/59 |
| 5,539,551 | 7/1996 | Nomoto et al. | 359/59 |
| 5,546,204 | 8/1996 | Ellis | 359/59 |

FOREIGN PATENT DOCUMENTS

| | | |
|---|---|---|
| 0 552 952 | 7/1993 | European Pat. Off. . |
| 2 571 526 | 4/1986 | France . |

*Primary Examiner*—Michael H. Lee
*Attorney, Agent, or Firm*—Oblon, Spivak, McClelland, Maier & Neustadt, P.C.

[57] ABSTRACT

A multiplex control active matrix display screen including a first transparent substrate supporting an array of electrodes controlled by an array of transistors. Each transistor has two control gates. The second gates are interconnected along an addressing row or column. The rows and columns are interconnected in groups of N. The transistors of a column or row are then controlled by multiplexed three control signals.

6 Claims, 7 Drawing Sheets

MULTIPLEXED CONTROL ACTIVE MATRIX DISPLAY SCREEN

BACKGROUND OF THE INVENTION

1. Field of the Invention

The present invention relates to a multiplexed control active matrix display screen. The screen according to the invention can be used for televisions, computers, vehicle instrument panels (cars, aircraft, etc.).

2. Discussion of the Background

A display screen essentially consists of two transparent plates retaining between them an electrooptical material, e.g. a liquid crystal. The attached FIGS. 1 and 2 show examples of such plates.

Firstly, FIG. 1 shows a transparent substrate 10, e.g. of glass, covered:

- by a first series of addressing conductive strips 12 arranged in column form, e.g. of indium and tin oxide (ITO),
- by an array of electrodes 14, each constituting a display point or pixel,
- and by a second series of addressing strips 16 arranged in row form and generally constituted by a stack of layers, namely a semiconductor layer (e.g. of aSi:H), an insulating layer (e.g. of SiN) and a conductive layer (e.g. of aluminium).

The electrodes 14 are extended by a finger 20 in such a way that said finger and the column form the source and the drain of a thin film transistor (TFT), the gate being constituted by the metallic layer of the addressing line.

FIG. 2 shows a second plate with a second transparent substrate 30 (e.g. of glass), blocks of light filters 32 (red, green, blue), a black matrix 34 and a conductive and transparent counterelectrode 36. The light filters 32 and the black matrix 34 are not essential in the invention to be described hereinafter, but are still useful.

Such a screen, or at least the first plate illustrated in FIG. 1, can be obtained by a process only requiring two photolithography levels, as described in FR-A-2 533 072.

The screen is completed by control circuits located on the periphery of the plates, as is diagrammatically illustrated in FIG. 3. It is possible to see therein six column control circuits (sometimes called column drivers) CCC1 and CCC6 and distributed along the top and bottom edges of the screen 40 and two row control circuits (sometimes called row drivers) CCL1 and CCL2 arranged along the left-hand edge of the screen. Each control circuit is able to apply appropriate voltages to a plurality of columns or rows. Generally successive application takes place to the rows of a vertical scan signal and to the columns and in simultaneous manner a video signal.

Although these devices are satisfactory in certain respects, they still suffer from disadvantages. Thus, the peripheral integrated circuits necessary for control purposes are prejudicial to the costs of the screen and significantly increase its overall dimensions.

SUMMARY OF THE INVENTION

The present invention therefore aims at obviating these disadvantages.

For this purpose the invention provides an arrangement making it possible to reduce the number of control circuits, particularly the number of column control circuits. For this purpose, each transistor is provided with a second control gate and all the second gates of the transistors e.g. belonging to the same addressing column are interconnected. These gate columns are interconnected on a basis of one column out of N (N being an integer at least equal to 2). The addressing columns are also interconnected by groups of N. In order to control a transistor, it is then necessary to have three control voltages, namely a first voltage applied to all the addressing columns of a group, a second voltage applied to the second gate of the transistor by the corresponding column of the second gates and finally a third voltage applied to the first gate by the addressing row.

Thus, in such a control there is multiplexing at the column signals and it is necessary to have two column voltages for correctly controlling a transistor, one for the group of columns to which the transistor belongs and the other for one of the columns of the second gates of said group.

Said structure naturally assumes that the control circuits of the second gates have been provided, which would appear to oppose the sought aim. However it must be borne in mind that only N circuits of this type are required, because there are N columns of second gates in the same group of addressing columns, whereas the number of control circuits of the columns is subdivided by N, because these columns have been combined in groups of N. However, this second effect considerably prevails over the first. On e.g. taking N=2, it is necessary to add two control circuits of the second gates, whereas the number of control circuits for the columns will be divided by two. A there is generally a large number of columns (more than one hundred), the reduction obtained due to the division by 2 will considerably prevail over the addition of two circuits. Therefore the balance is very positive.

What has been stated above can be immediately transposed to the case of combining rows and no longer columns in groups of N. The multiplexing would then take place on the rows and also on the columns, but the gain with respect to the control circuits would be the same and would then affect the row control circuits.

The second gates of the transistors can be obtained by any conductive material deposited on the transparent substrate and beneath the transistor. However, according to a preferred embodiment, said conductive material is at the same time opaque to ambient light, so that each second gate at the same time constitutes an optical mask protecting the transistor from light.

In this connection it should be observed that the invention does not relate to the providing of an optical mask beneath the transistors, because this arrangement is already known. Thus, it is known that for avoiding excessive illumination disturbing the operation of the transistors, beneath of them can be placed an opaque mask. Such a procedure is e.g. described in the article by TOMISHISA SUNATA et al entitled "A large-area high-resolution active-matrix color LCD addressed by A-Si TFT's", published in the journal "Proceeding of the Society for Information Display (SID)", 27, 1986, No. 3, pp 229–233.

This mask is generally constituted by an opaque metallic layer. It has been recognized that a second transistor is produced, but it has always been looked upon as disadvantageous. If this mask is at a floating potential, it can be raised to a positive potential and give rise to leakage currents, which are prejudicial to the operation of the screen.

Consideration was then given to the connection of such a mask to one of the electrodes of the transistor in order to fix the potential thereof. This is what is proposed e.g. in EP-A-179 915.

Another solution is known and is described in EP-A-136 509 and consists of introducing beneath thin film transistors an optical mask partly passing beneath the pixel. The leakage current in the transistor is reduced and a supplementary storage capacity is formed.

EP-A-564 337 already discloses a display screen in which the optical mask is constituted by the same number of opaque conductive lines as there are addressing rows, all the opaque conductive lines being interconnected and connected to a contact able to raise the complete optical mask to a reference potential.

In all these known, optical mask-based variants, the mask is never used as a control means for transistors. In addition, the addressing columns are not grouped and connected to the same control circuit, which allows multiplexing. The use of the optical mask as the control gate of the transistor in connection with multiplexing has never been conceived by the expert.

More specifically, the present invention relates to a multiplexed control active matrix display screen comprising:

a first plate comprising a first transparent substrate supporting an array of electrodes controlled by an array of transistors, each transistor comprising a source, a drain and a first gate; a first group of addressing conductive strips arranged in column form; a second group of addressing conductive strips arranged in row form, the drain and source of each transistor being respectively connected to an addressing column and to an electrode, the first gate being connected to an addressing row, control means comprising control circuits able to apply appropriate voltages to the column strips and the addressing rows, a second plate comprising a second transparent substrate coated with a counterelectrode, said screen being characterized in that:

a) each transistor has a second gate positioned facing the first, b) all the second gates of the transistors corresponding to one addressing strip out of N are electrically interconnected, in which N is an integer at least equal to 2 (N groups of second gates being formed in this way), c) the consecutive addressing strips (columns or rows) are electrically regrouped N by N, the N strips of a first group being connected to the same addressing circuit, the number of said addressing circuits then being equal to the number of addressing strips (columns or rows) divided by N, d) the control means also comprise N supplementary control circuits able to apply to each of the N groups of second gates appropriate voltages in agreement with the signals applied to the addressing strips.

Preferably, the second gates of the transistors are constituted by a conductive layer subdivided into N patterns electrically isolated from one another and nested in one another, each pattern comprising strips passing beneath the transistors. In a simple embodiment the number N is equal to 2.

The electrooptical material inserted between the two plates is preferably a liquid crystal.

DETAILED DESCRIPTION OF EMBODIMENTS

Figure 4:
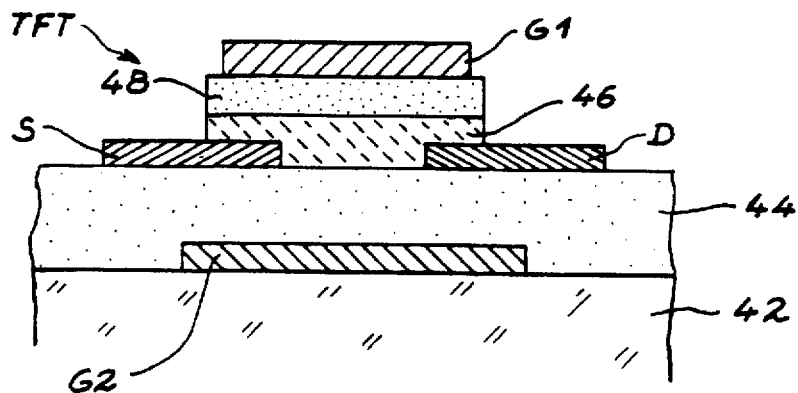
FIG. 4 shows in section a thin film transistor with two gates.

FIG. 4 shows in section a two-gate, thin film transistor. On a substrate 42 is deposited a lower gate or second gate G2, a first insulating layer 44, a drain D, a source S, a semiconductor layer 46, a second insulating layer 48 and an upper gate or first gate G1.

It is possible to use any process for producing such a transistor.

Preference is given to the use of the process having two photolithography levels described in FR-A-2 533 072, supplemented by a third level able to produce the second gate G2.

Figure 5:
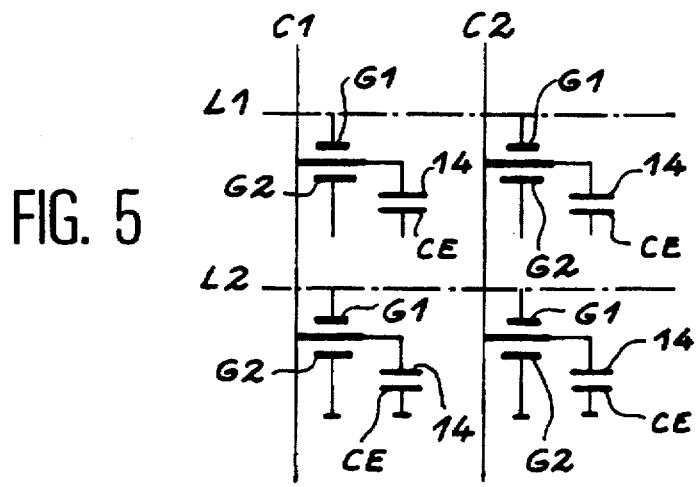
FIG. 5 is an equivalent circuit diagram of the screen according to the invention.

FIG. 5 shows the equivalent circuit diagram limited to four transistors. It is possible to see two addressing rows L1, L2, two addressing columns C1, C2, the capacitors formed by the electrodes 14 and by the counterelectrode CE. The gates G1 are connected to the addressing rows and the gates G2 to connections to be defined hereinafter.

Figure 6:
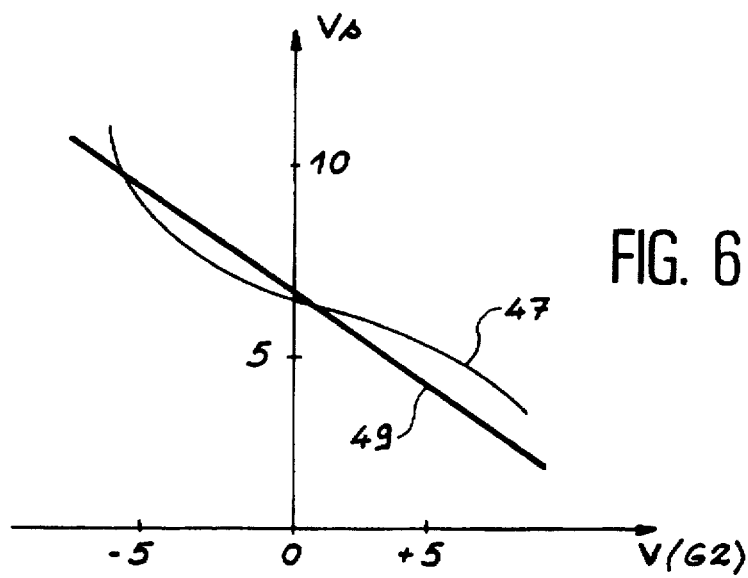
FIG. 6 illustrates the variation of the threshold voltage of a two-gate transistor as a function of the voltage applied to the second gate.

The potential of the second gate G2 modifies the characteristics of the transistor. The threshold voltage, which is the gate voltage as from which the transistor becomes conductive, is displaced under the effect of the voltage applied to the second gate. FIG. 6 shows the variations of said threshold voltage Vs as a function of the voltage V(G2) applied to the second gate. Curve 47 shows the measured variation and line 49 the approximate linear variation. It can be seen that the threshold voltage decreases when the voltage applied to the second gate increases. For a zero voltage applied to G2, there is a threshold of approximately 7.5 V, which is the threshold of a single gate transistor. If a very negative voltage is applied to G2, the transistor is blocked up to at least 10 V, whereas if a positive voltage is applied the threshold drops to a few Volts.

Throughout the remainder of the description, it will be assumed that the integer N represents the order of the multiplexing and is equal to 2. In other words, the columns or rows are grouped pairwise and the strips of second gates G2 are interconnected on a basis of one strip out of every two. In practice, this amounts to producing on the substrate a conductive layer broken down into two patterns, each pattern comprising vertical or horizontal strips, the strips of one pattern alternating with those of the other. Naturally, this in no way limits the invention, which covers the general case of a random number N.

Figure 7:
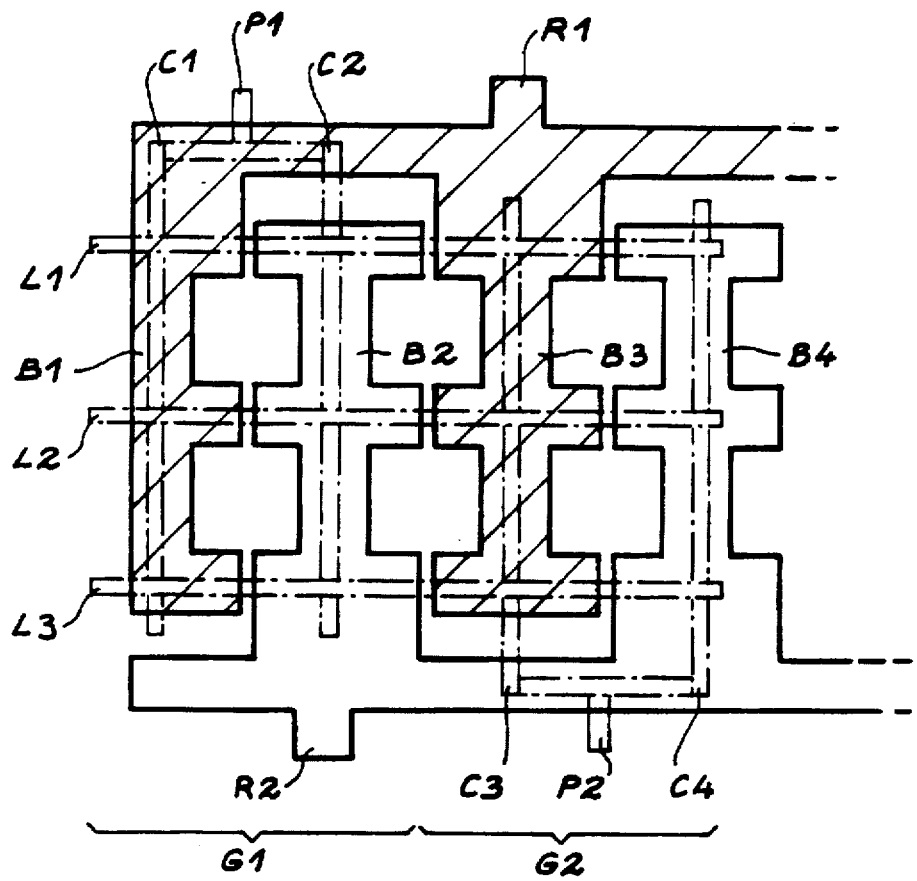
FIG. 7 shows the subdivision of the optical mask into two vertical, interdigitated parts permitting the pairwise regrouping of the columns.

In FIG. 7, the optical mask (hatched area) is broken down into two interdigitated patterns constituting the two electrodes to which are applied different potentials. By applying a negative potential to a fraction of the optical mask, it is possible to inhibit part of the transistors of the matrix or array by raising their threshold voltage, whereas the other part of the transistors will be normally controlled. Pairwise interconnection takes place of the columns of the matrix in order to divide by two the access number thereof, in order to divide by two the number of peripheral control circuits. Thus, the columns C1, C2 are connected to an element P1, the columns C3, C4 to an element P2, etc.

The second gates of transistors corresponding to the first column C1 are constituted by the strip B1 of the top pattern and the second gates of the transistors corresponding to the second column C2 are constituted by the strip B2 of the bottom pattern, etc. The top pattern is also connected to a connection element R1 and the bottom pattern to a connection element R2.

Figure 8:
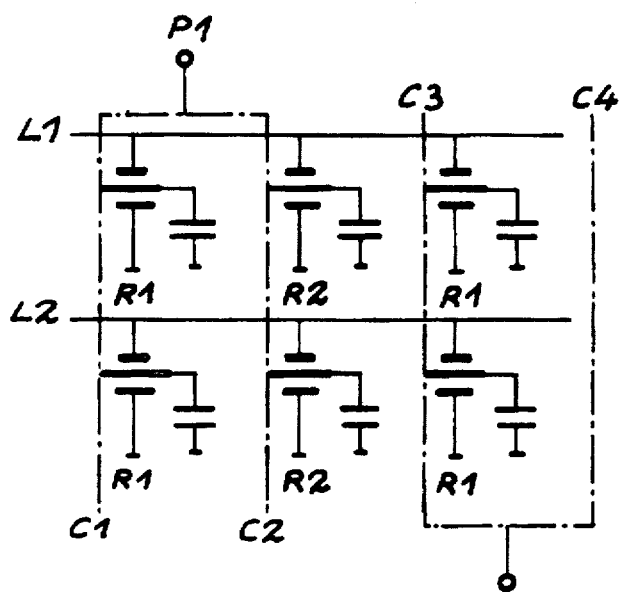
FIG. 8 is the equivalent circuit diagram of said variant.

FIG. 8 is the equivalent circuit diagram in the case of this variant. It is possible to see the pairwise grouping of the columns and, in each group, the transistors, whose second gate is raised to the potential of the element R1 for the first column and to the potential of the element R2 for the second column.

A negative potential on the element R1 blocks the transistors of the uneven columns (C1, C3, etc.). A positive potential on the element R2 lowers the threshold of the transistors of the even columns, which could be controlled by a suitable row signal.

Figure 9:
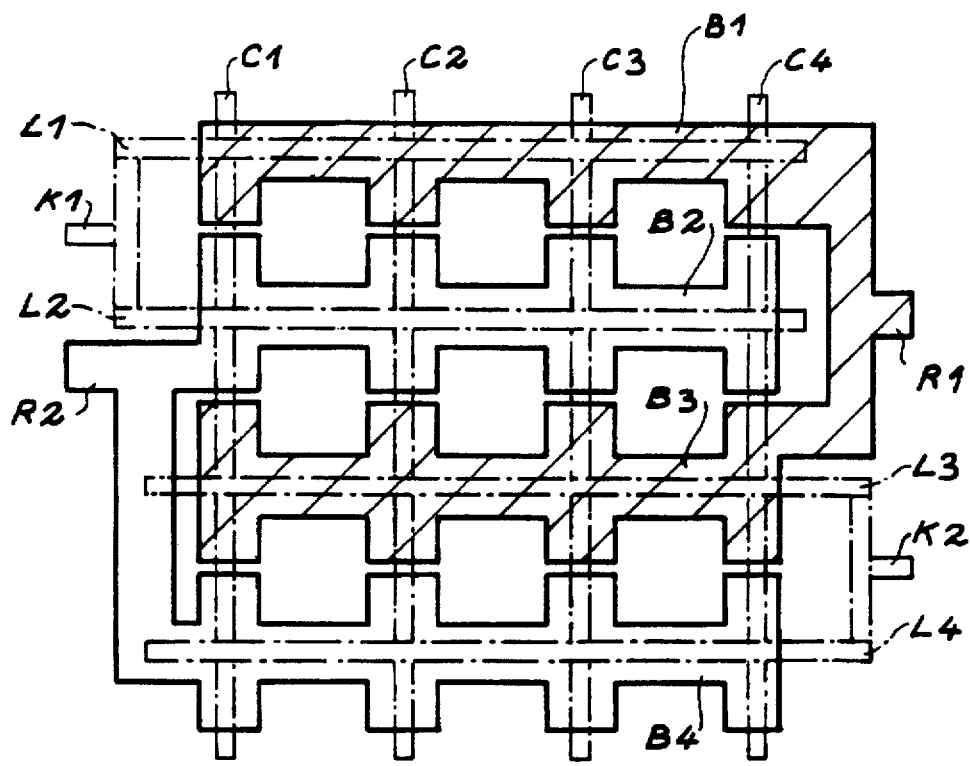
FIG. 9 shows the subdivision of the optical mask into two horizontal, interdigitated parts permitting the pairwise regrouping of the rows.
Figure 10:
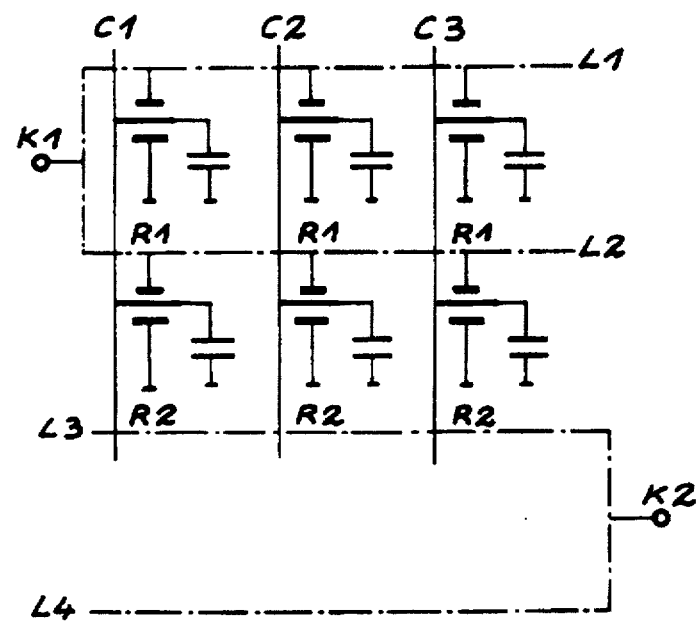
FIG. 10 is the equivalent circuit diagram of said other variant.

FIG. 9 corresponds to FIG. 7, but with a grouping affecting the rows and not columns. The rows are grouped pairwise and each group is connected to an element K1, K2. The optical mask is subdivided into two interdigitated patterns with a right-hand part connected to an element R1 and a left-hand part connected to an element R2.;

FIG. 10 shows the equivalent circuit diagram with groups of rows (L1, L2) (L3, L4) and the connection of the second gates sometimes to R1 and sometimes to R2 in each group.

A negative potential on element R1 blocks the transistors of the uneven rows (L1, L3, etc.). A positive potential on the element R2 will lower the threshold of the transistors of the even rows, which could be controlled by an appropriate row signal.

Figure 11:
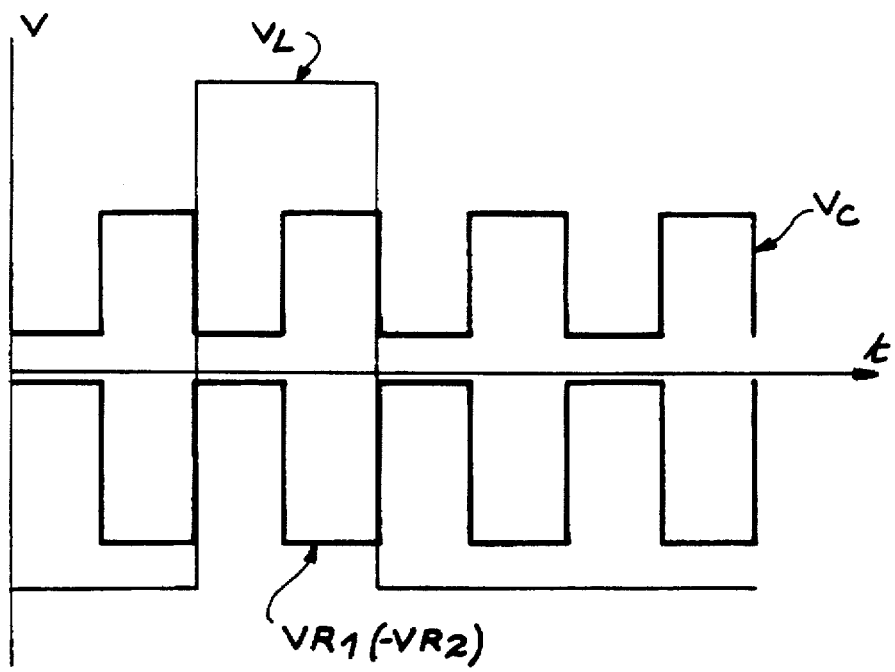
FIG. 11 shows the row signal and column multiplexing signals.
Figure 12:
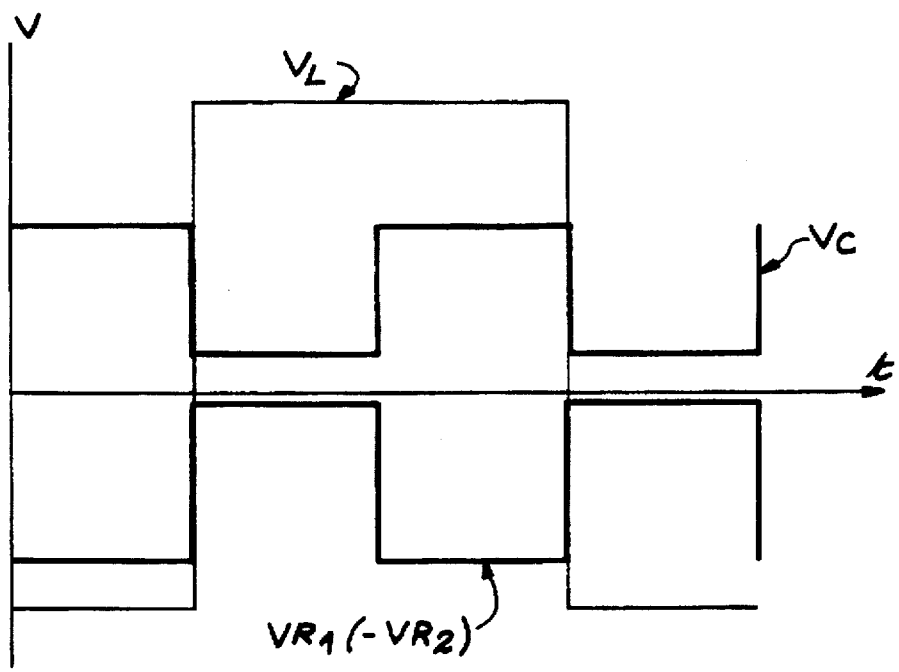
FIG. 12 shows the column signal and row multiplexing signals.

FIGS. 11 and 12 are timing diagrams showing the control signals of the two configurations of FIGS. 7 and 9 respectively. For reasons of simplicity, use is made of an operating mode with a constant counterelectrode potential. However, the principle also applies in the case of a modulated potential counterelectrode.

Thus, FIGS. 11 and 12 show the row signal $V_L$, the column signal $V_C$ and the signal VR1 applied to the element R1, knowing that the signal VR2 applied to the element R2 is in phase opposition with VR1.

During the row access time, each output of the column control circuit supplies two successive voltages, respectively for the first and second points. During the first part of the row period, the voltage VR1 applied to R1 is low and the second gate of the transistors of the first column does not block the transistors. At the same time, the voltage VR2 (not shown, but in opposition with VR1) is high and the transistors of the second column are blocked. In the second part of the row access time the situation is reversed, i.e. the transistors of the first column are blocked and those of the second column are unblocked. FIG. 12 shows the same type of timing diagram, but for the configuration of FIG. 9.

Figure 1:
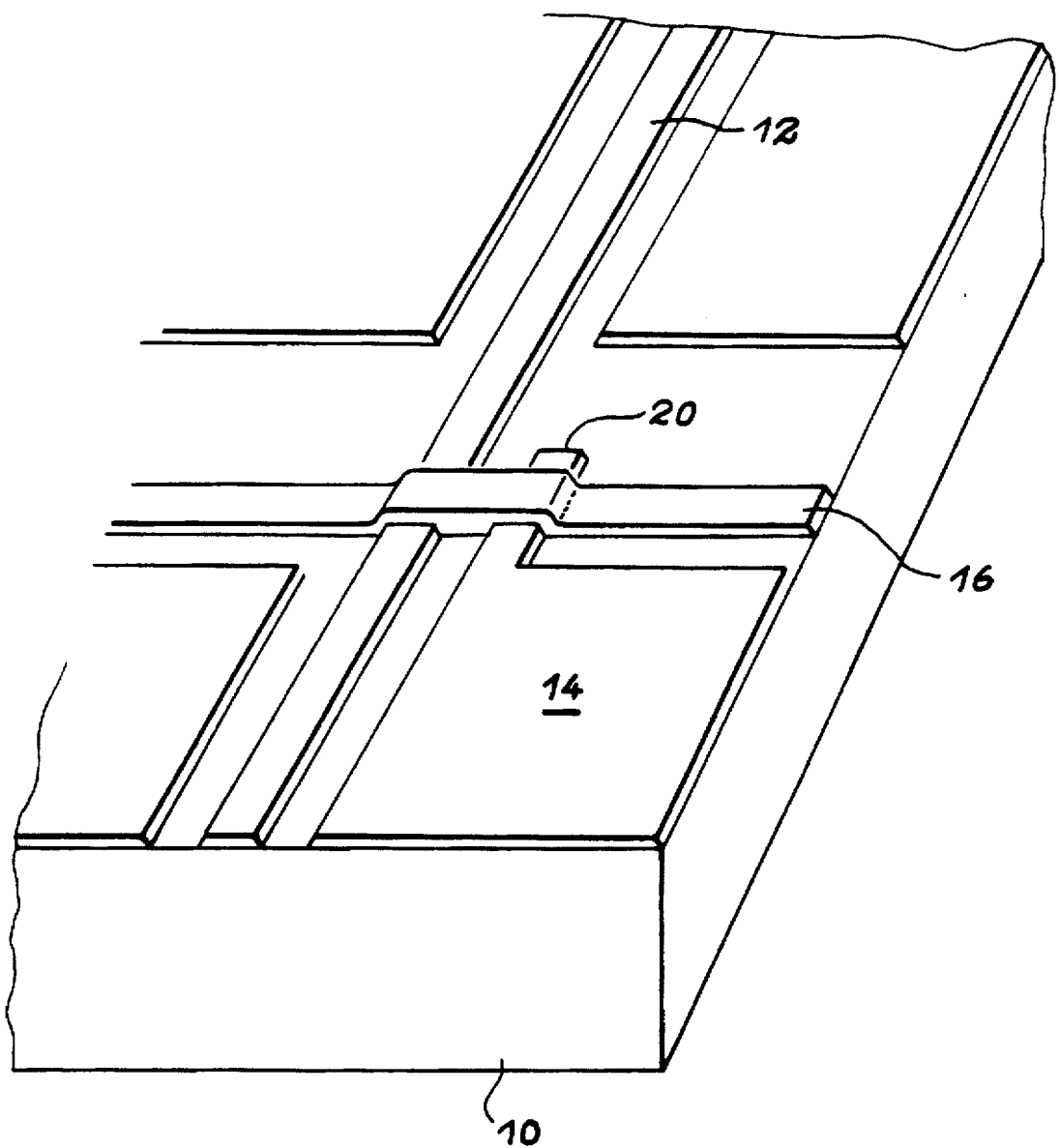
FIG. 1, already described, shows a first plate of a screen according to the prior art.
Figure 2:
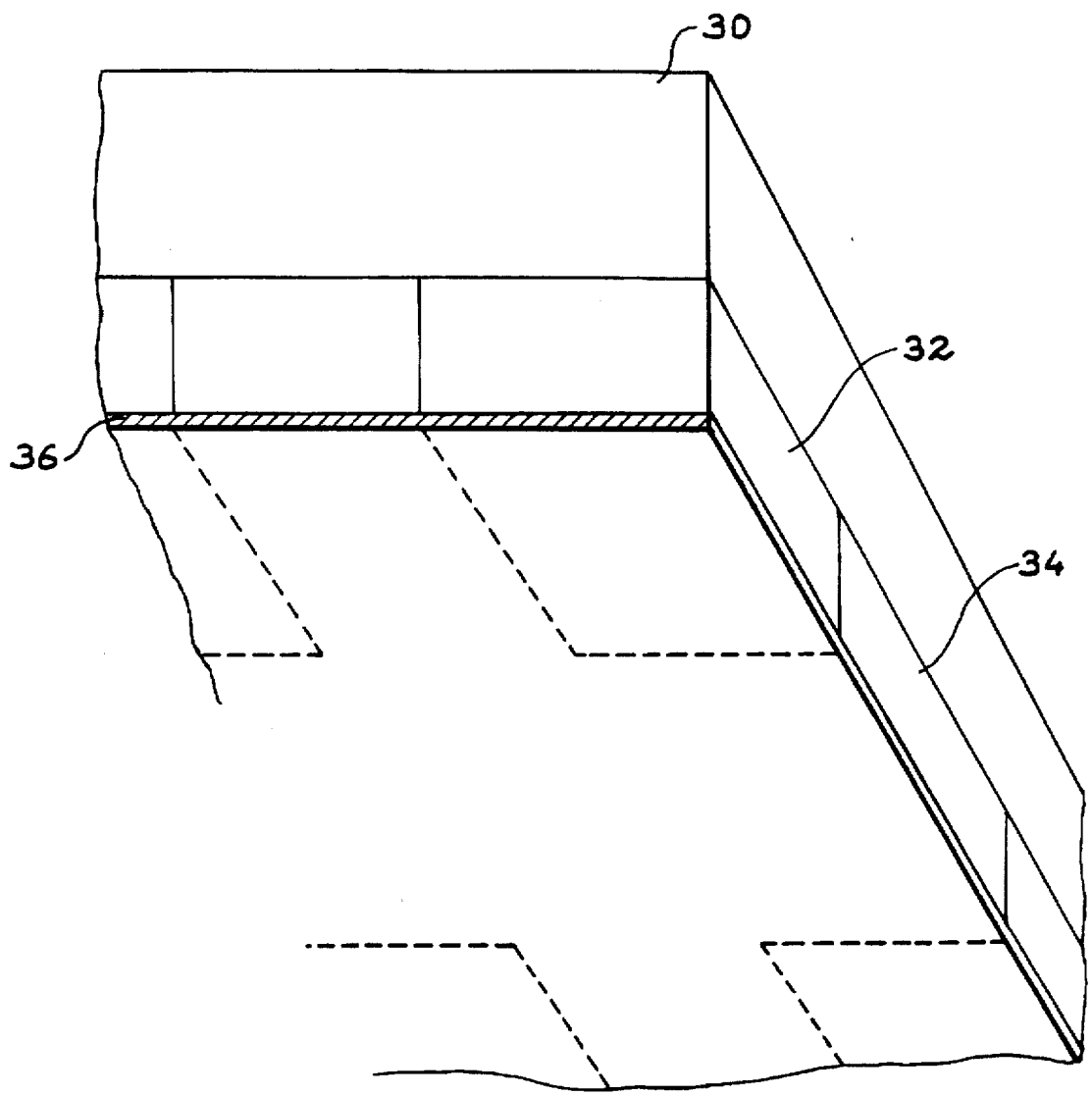
FIG. 2, already described, shows a second plate according to the prior art.
Figure 3:
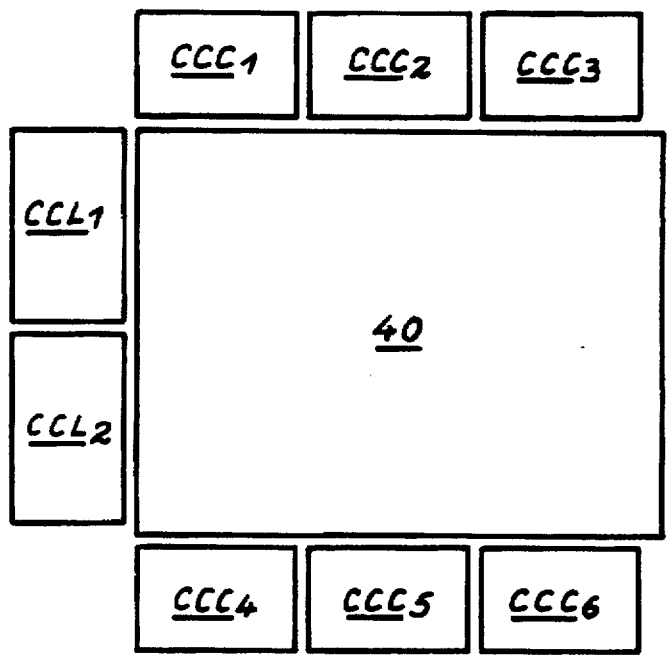
FIG. 3, already described, diagrammatically shows a screen with peripheral control circuits according to the prior art.
Figure 13:
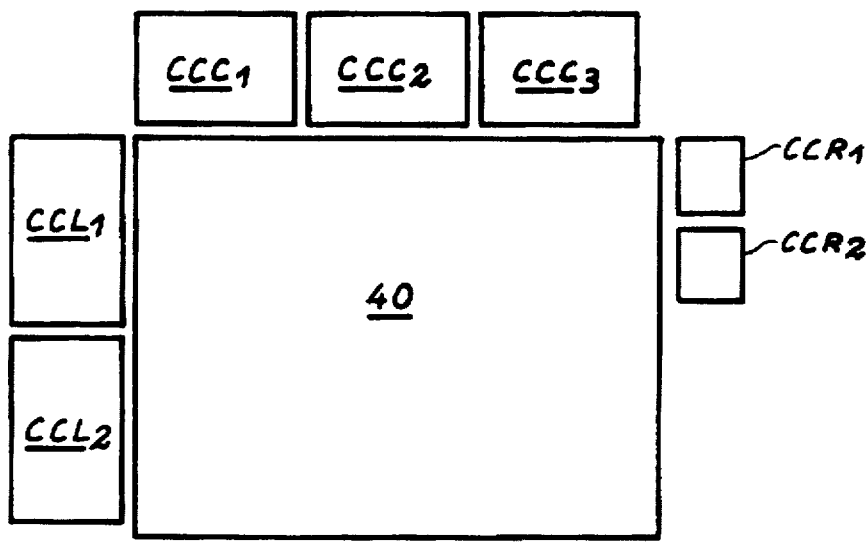
FIG. 13 shows a screen according to the invention with its peripheral control circuits.

FIG. 13 diagrammatically shows a screen according to the invention with its control circuits. Compared with FIG. 3 (showing a prior art screen), it is possible to see two row control circuits CCL1, CCL2, but only half the column control circuits, i.e. three instead of six (CCC1 to CCC3). However, there are two circuits CCR1, CCR2 able to apply appropriate voltages to the elements R1 and R2 of the two electrode patterns serving as an optical mask. However, these circuits are much simpler than the column control circuits.

In order to further illustrate the advantages of the invention, consideration will be given to the case of a 13 cm (5.1 inch) screen for car applications. Its complexity is 240 rows of 320 pixels RVB, i.e. a quarter of the so-called VGA standard (Video Graphic Area). The spacing of the points is 324 µm vertically and 108 µm horizontally. It is produced with a three masking level technology. The active plate is in accordance with FIG. 7 with column complexing. The columns are connected pairwise: C1–C2, C3–C4, etc. The access elements P1, P2, etc. are provided on one side only (at the top) and have double the spacing of the points, i.e. 26 µm, which is compatible with a standard link with a spacing of 200 or 180 µm. The row accesses have a spacing of the points of 324 µm. Thus, the cell is interconnected on two sides only.

We claim:

1. Multiplexed control active matrix display screen comprising:

a first plate comprising a first transparent substrate supporting an array of electrodes controlled by an array of transistors, each transistor comprising a source, a drain and a first gate; a first group of addressing conductive strips arranged in column form; a second group of addressing conductive strips arranged in row form; the drain and source of each transistor being respectively connected to an addressing column and to an electrode, the first gate being connected to an addressing row, control means comprising control circuits for applying appropriate voltages to the addressing conductive strips in column form and the addressing conductive strips in row form, a second plate comprising a second transparent substrate coated with a counterelectrode, said screen being characterized in that:

a) each transistor has a second gate positioned facing the first gate, b) all the second gates of the transistors corresponding to one addressing conductive strip out of N are electrically interconnected, in which N is an integer at least equal to 2 (N groups of second gates being formed in this way), c) consecutive addressing conductive strips (columns or rows) are electrically regrouped N by N, N strips of a first group being connected to one addressing circuit, a number of addressing circuits then being equal to a number of addressing conductive strips (columns or rows) divided by N, d) the control means also comprise N supplementary control circuits for applying to each of the N groups of second gates appropriate voltages in agreement with signals applied to the addressing conductive strips.

2. Display screen according to claim 1, characterized in that the second gates (G2) are constituted by a conductive layer subdivided into N patterns electrically isolated from one another and nested in one another, each pattern comprising strips passing beneath the transistors.

3. Display screen according to claim 2, characterized in that the addressing conductive strips of each pattern are parallel to the addressing columns (12).

4. Display screen according to claim 2, characterized in that the addressing conductive strips of each pattern are parallel to the addressing rows (16).

5. Display screen according to any one of the claims 1 to 4, characterized in that the integer N is equal to 2, a conductive layer being subdivided into two interdigitated patterns, each pattern passing beneath the transistors of every other addressing row or column.

6. Display screen according to claim 1, characterized in that all the second gates (G2) of the transistors (TFT) are made from an opaque material, said second gates thus also constituting an optical mask protecting the transistors.

* * * * *